United States Patent [19]
Collison

[11] 3,734,060
[45] May 22, 1973

[54] LIQUID SUPPLEMENT LIVESTOCK FEEDER

[76] Inventor: Roland B. Collison, 102 - 19th Drive, Norfolk, Nebr. 68701

[22] Filed: May 3, 1971

[21] Appl. No.: 139,438

[52] U.S. Cl. ............................... 119/51 R, 119/157
[51] Int. Cl. ................................................. A01k 5/00
[58] Field of Search ............................... 119/51, 157

[56] References Cited

UNITED STATES PATENTS

| | | | |
|---|---|---|---|
| 3,459,159 | 8/1969 | Reed | 119/51 R |
| 1,221,675 | 4/1917 | Carson | 119/157 |
| 1,315,583 | 9/1919 | Starbuck | 119/157 |
| 2,158,093 | 5/1939 | Teske | 119/51 R |
| 3,008,452 | 11/1961 | Baird | 119/157 |
| 3,035,547 | 5/1962 | Elwick | 119/157 |

Primary Examiner—Aldrich F. Medbery
Attorney—Clarence A. O'Brien and Harvey B. Jacobson

[57] ABSTRACT

A liquid supplement feeder for livestock, and the like, said feeder having a plurality of licking chain assemblies, each assembly including a continuous multi-link chain, the lower portion of which dips into a tank or container of liquid supplement, and the top portion of which is slidably supported by a smoothly curved fiber glass channel where it is exposed to the livestock which lick the chain to derive liquid supplement therefrom. The licking action of the livestock places sufficient forces on the chain to advance it into the liquid supplement, thereby constantly replenishing the supplement which clings to the chain to provide a continuous supply of liquid supplement to the livestock.

10 Claims, 3 Drawing Figures

PATENTED MAY 22 1973

3,734,060

Roland B. Collison
INVENTOR.

BY *Clarence A. O'Brien*
*and Harvey B. Jacobson*
Attorneys

LIQUID SUPPLEMENT LIVESTOCK FEEDER

The present invention is generally related to livestock feeders, and, more particularly, to livestock feeders of the liquid supplement type.

In the past, liquid supplement livestock feeders have been provided, but many of these constructions were relatively complex in nature, and often required power driven machinery to deliver and replenish the liquid supplement. The more simple conventional constructions were often such that the liquid was exposed to the elements and unclean surroundings, rendering such constructions unacceptable for use outdoors or in most areas common to livestock raising. Furthermore, while many conventional feeders automatically replenished the supplement by the licking action of the livestock, such feeders included moving parts, such as rotating wheels, gears and the like which were easily susceptible to sticking and clogging over a relatively short period of time, requiring constant cleaning attention, such cleaning often requiring dismantling of the feeder.

It is an object of the present invention to provide a versatile liquid supplement feeder for livestock which is relatively simple in construction and compact, yet inexpensive to produce and maintain, long lasting and impervious to the elements.

Another object of the present invention is to provide a novel livestock feeder for liquid supplement which requires a minimum number of moving parts and which is substantially sealed from the elements and the unclean surroundings common to the raising of livestock.

Still another object of the present invention is to provide a versatile liquid supplement livestock feeder which is of heavy duty construction, durable, able to withstand impact from the livestock and which is not susceptible to sticking and clogging, and which may be easily cleaned without dismantling.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
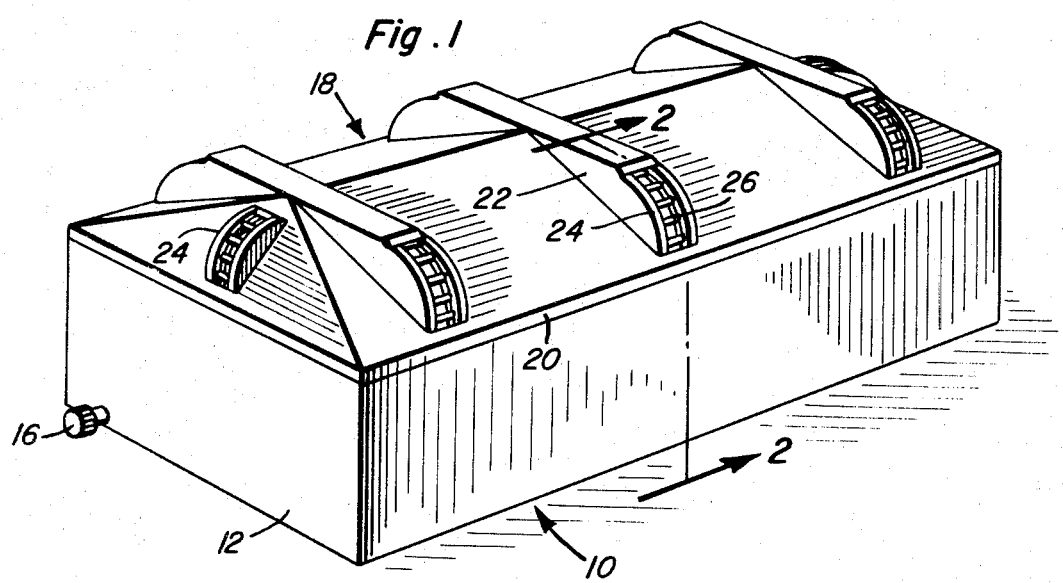
FIG. 1 is a perspective view of the liquid supplement livestock feeder of the present invention.

Referring now more specifically to FIG. 1, the liquid supplement feeder is generally referred to by the numeral 10, and includes a tank or container 12 made of heavy gauge sheet metal, or similar materials, and is adapted to store a liquid supplement 14 for the dispensing thereof, as hereinafter explained. The tank 12 may be of welded construction, and may be reinforced by conventional means, if desired. The tank, however, should be sufficiently rigid, not only to withstand the pressures of the liquid contained therein, but also, to withstand the impact commonly experienced due to the livestock kicking, and otherwise moving about the feeder. A drain plug 16 may be provided at the bottom of one of the end walls of the tank for easily draining the liquid supplement therefrom, and to aid in periodic cleaning of the tank.

A cover or lid 18, of fiber glass reinforced plastic, or similar materials, is mounted on top of the tank, and preferably, has a downwardly extending lip 20 around the perimeter thereof for sealably engaging the upper perimeter edges of the tank 12. The cover 18 may be generally concave in shape to provide additional strength to support weight or forces which may be directed in a downward direction against the cover. The lid is provided with a plurality of licking chain assemblies 22, each of which includes a chain hood 24 which partially surrounds a licking chain 26. The licking chain assemblies preferably are spaced around the perimeter portion of the feeder, such that they are readily accessible to livestock within the area of the feeder.

Figure 2:
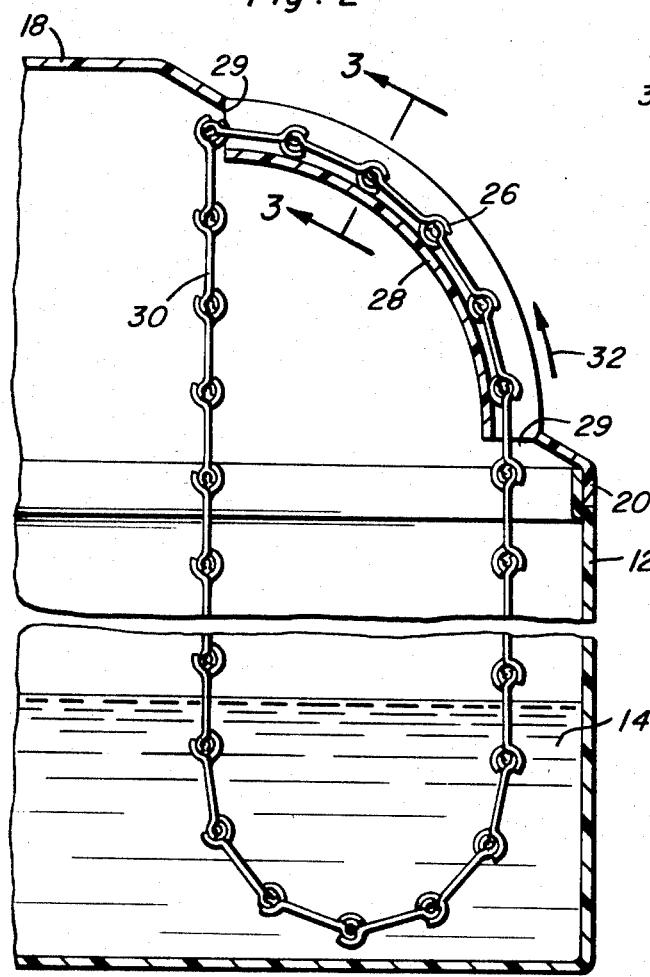
FIG. 2 is a sectional view of the feeder taken along section 2—2 of FIG. 1 illustrating a licking chain extending into the liquid supplement tank.

Referring now to FIG. 2, it is seen that the upper portion of the licking chain 26 rests upon a smoothly, upwardly curved support surface 28 formed in cover 18. Openings 29 at the ends of the support surfaces, permit the chain to enter and leave the tank 12. Each licking chain 26 is comprised of a series of pivotally connected elongated links 30, made of corrosion resistant steel, or the like. The liquid supplement 14 is of such a consistency, or viscosity, that it clings to each link of the chain, thereby providing the chain with a thin coating of liquid supplement. The upper portion of the chain, being exposed to the livestock, can easily be licked by livestock desiring to derive the liquid supplement therefrom. The licking action, being in the upward direction, not only removes part of the liquid from the chain, but tends to advance the chain in a direction indicated by arrow 32. Thus, it is not necessary to provide any powered machinery to supply the liquid supplement to the livestock as it is used, the chain being advanced automatically through the licking action of the livestock.

It is appreciated, that, essentially, there is only a single moving part, namely the chain, and, as such, the feeder is not susceptible to sticking or clogging, as is common with conventional feeders. The smooth upwardly curved surface 28 engages portions of each link of the chain in such a manner that sticking between the engaging surfaces is eliminated. Excess liquid supplement clinging to the undersurfaces of the chain links drains therefrom along surface 28 and drips back into the container tank 12.

Figure 3:
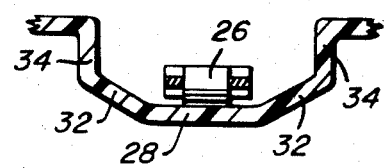
FIG. 3 is a sectional view taken along section 3—3 of FIG. 2, illustrating the licking chain seated in sliding engagement with a guide channel.

Referring to FIG. 3, it can be seen that the chain 26 is guided along surface 28 by a pair of slanted guide surfaces 32 extending upwardly from opposite sides of support surface 28 and adjoin vertical side walls 34 to form a guide channel for the chain. Preferably, the width of surface 28 is slightly greater than that of chain 26 to permit slight transverse movement of the chain, thereby preventing possible binding between the engaging guide surfaces. Also, it should be noted that the guide channels are each molded from fiber glass reinforced plastic, such that there are no cracks or seams in which dirt and other contaminants may accumulate. This is extremely important since such a construction permits easy, yet thorough, cleaning of the guide channels. Cleaning can be easily achieved by manually raising the chain above the channel surfaces to expose the surfaces for wiping contaminants therefrom. Thus, cleaning is achieved without removal of any parts of the feeder and without removing the lid or cover 18 from container tank 12.

It is appreciated, that the over-all construction of the present invention is relatively simple, it being comprised of three basic components, the container tank, the cover or lid, and the licking chain. It should be noted, that it is foreseeable that the feeder of the present invention could be provided with more or less licking chain assemblies than the number shown in the drawings. Likewise, changes in the shape or material of the licking chains, container tank, or cover construction are deemed to fall within the scope of the present invention. Due to the relative simplicity, and the molded fiber glass construction of the feeder cover, it is possible to mass produce the feeder, thereby further reducing the manufacturing costs and ultimate selling price to the consumer. Thus, it is appreciated, that the feeder of the present invention has a minimum number of parts, is highly durable and long lasting, is easy to clean, yet is relatively inexpensive to manufacture.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A supplement feeder comprising container means for storing the liquid supplement, transfer means communicating with said container means for contacting the supplement and transferring it to an area readily accessible to livestock, and means for supporting said transfer means for advancement and movement to and from the supplement in said container means, said support means comprising a cover extending above said container means, said cover having at least one guide channel formed therein supporting said transfer means, said transfer means comprising a flexible continuous length member having an upper portion which slidably engages said guide channel and a depending portion hanging freely from said upper portion, said guide channel including a smooth surface on which the upper portion of said continuous member rests for sliding movement thereover, the depending portion of said continuous member being free to move randomly under the influence of the licking action of livestock.

2. The structure set forth in claim 1 wherein said cover has at least one pair of openings, each adjacent to an opposite end of said smooth surface, said continuous member extending through said openings.

3. A supplement feeder comprising container means for storing the liquid supplement, transfer means communicating with said container means for contacting the supplement and transferring it to an area readily accessible to livestock, and means for supporting said transfer means for advancement and movement to and from the supplement in said container means, said support means comprising a cover extending above said container means, said cover having at least one guide channel formed therein for supporting said transfer means, said means comprising at least one continuous length member having a lower portion adapted to contact the supplement in an upper portion which slidably engages said guide channel, said guide channel including a smooth surface on which the upper portion of said continuous member rests for sliding movement thereover under the influence of the licking action of livestock, said cover having at least one pair of openings, each adjacent to an opposite end of said smooth surface, said continuous member extending through said openings, said smooth surface supporting the upper portion of said transfer means curves gently upwardly, said continuous member being of a flexible construction such that it follows said curved surface.

4. The structure set forth in claim 3 wherein said continuous member is comprised of a continuous length of link chain having a series of pivotally connected links.

5. The structure set forth in claim 4 wherein said container means is comprised of a tank, said cover snugly connected to said tank to prevent the entrance of contaminants surrounding the feeder.

6. The structure set forth in claim 5 wherein said cover, guide channel, and gently curved support surface is of one-piece molded plastic construction for easy cleaning.

7. The structure set forth in claim 6 wherein said feeder is comprised of a plurality of said guide channels in said cover and a plurality of said link chains, one in each of said guide channels, whereby said feeder can accommodate a plurality of livestock desiring the liquid supplement.

8. A liquid supplement container and feeder for livestock, said feeder comprising a continuous length of link chain, said chain including an upper portion which is adapted to be exposed to the livestock for licking thereby and a lower portion which is loosely suspended in said container to contact the liquid supplement to obtain a coating thereof, and means underlying said upper portion supporting said chain for movement in one direction through the liquid supplement and preventing movement in the opposite direction, said support means comprising a support surface, said upper portion of said chain being in sliding engagement with said support surface for sliding movement thereover, said support surface extending upwardly in a direction generally parallel to the licking action of the livestock and terminating at an upper edge, said chain hanging vertically downward from and at an angle to said surface immediately adjacent said edge, whereby said chain is prevented from sliding in said opposite direction.

9. The structure set forth in claim 8 wherein said chain extends downwardly from said edge at an angle approximately equal to or less than 90° to said surface immediately adjacent said edge.

10. The structure set forth in claim 9 wherein said support surface comprises a relatively smooth, arcuate surface.

* * * * *